(12) United States Patent
Miyoshi et al.

(10) Patent No.: US 7,111,452 B2
(45) Date of Patent: Sep. 26, 2006

(54) CONTROL DEVICE OF HYDROGEN ENGINE

(75) Inventors: Seiji Miyoshi, Hiroshima (JP); Hiroshi Yamada, Hiroshima (JP); Akihide Takami, Hiroshima (JP)

(73) Assignee: Mazda Motor Corporation, Hiroshima (JP)

( * ) Notice: Subject to any disclaimer, the term of this patent is extended or adjusted under 35 U.S.C. 154(b) by 1 day.

(21) Appl. No.: 11/048,722

(22) Filed: Feb. 3, 2005

(65) Prior Publication Data
US 2005/0188683 A1 Sep. 1, 2005

(30) Foreign Application Priority Data
Feb. 26, 2004 (JP) .............................. 2004-050859

(51) Int. Cl.
*F01N 3/00* (2006.01)
(52) U.S. Cl. .............................. 60/285; 60/275; 60/295; 60/698; 123/DIG. 12; 123/431; 123/575
(58) Field of Classification Search ................ 60/275, 60/285, 295; 123/575, DIG. 12
See application file for complete search history.

(56) References Cited

U.S. PATENT DOCUMENTS

| | | | | |
|---|---|---|---|---|
| 4,003,345 A * | 1/1977 | Bradley | ...................... | 123/3 |
| 4,181,100 A * | 1/1980 | Yamane et al. | .............. | 123/431 |
| 4,253,428 A * | 3/1981 | Billings et al. | .............. | 123/1 A |
| 6,122,909 A * | 9/2000 | Murphy et al. | ................ | 60/286 |
| 6,264,899 B1 * | 7/2001 | Caren et al. | .............. | 422/186.3 |
| 6,311,648 B1 * | 11/2001 | Larocque | ........................ | 123/3 |
| 6,716,398 B1 * | 4/2004 | Caren et al. | ........... | 422/186.04 |
| 6,804,950 B1 * | 10/2004 | Kong et al. | .................... | 60/275 |
| 6,810,658 B1 * | 11/2004 | Kaupert et al. | ............... | 60/274 |
| 6,820,415 B1 * | 11/2004 | Abet et al. | ..................... | 60/286 |
| 2002/0029770 A1 * | 3/2002 | Heffel et al. | ................. | 123/527 |
| 2003/0089337 A1 | 5/2003 | Cohn et al. | | |
| 2005/0229872 A1 * | 10/2005 | Lange | ........................... | 123/3 |

FOREIGN PATENT DOCUMENTS

| | | |
|---|---|---|
| EP | 1 270 912 | 1/2003 |
| JP | 07-097906 | 4/1995 |
| JP | 10-311235 | 11/1998 |

\* cited by examiner

*Primary Examiner*—Thomas Denion
*Assistant Examiner*—Loren Edwards
(74) *Attorney, Agent, or Firm*—Donald R Studebaker; Nixon Peabody, LLP

(57) ABSTRACT

There are provided NOx trap catalyst to trap and release NOx based on air-fuel ratio, first fuel supply means for supplying gasoline, second fuel supply means for supplying hydrogen, engine operation detecting means for detecting engine operating condition, fuel ratio changing means for changing the ratio of gasoline and hydrogen, NOx release determining means for determining whether it is required for the NOx to be released based on a state of the trapped NOx, NOx releasing means for releasing the NOx trapped by making the air-fuel ratio rich when the NOx releasing requirement is determined, gasoline ratio increasing means for increasing the ratio of gasoline when NOx releasing requirement is determined and the air-fuel-ratio rich control is executed. Accordingly, improper vibrations or noises can be restrained from occurring when the rich air-fuel-ratio control is executed to release the trapped NOx from the NOx trap catalyst.

9 Claims, 14 Drawing Sheets

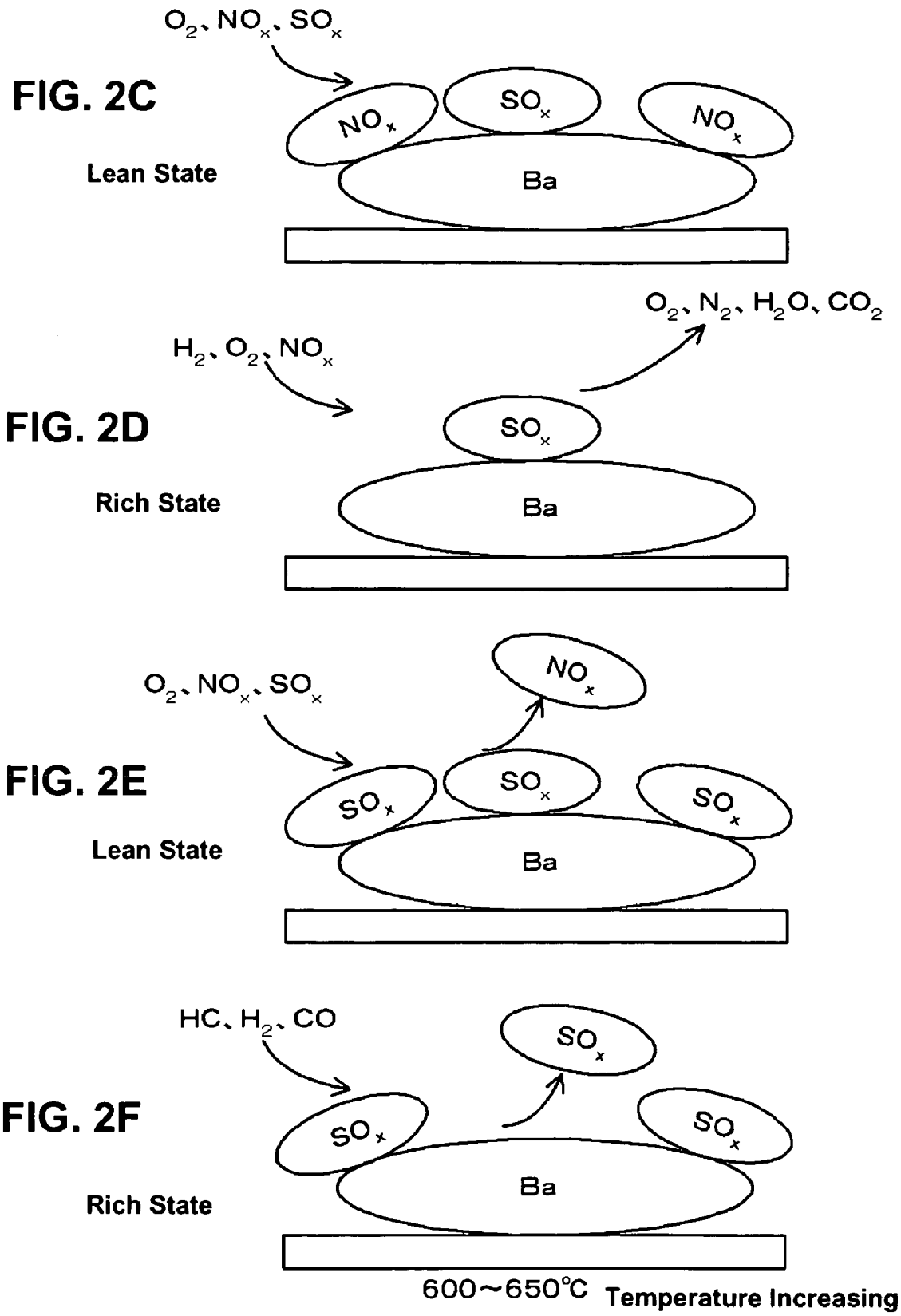

CONTROL DEVICE OF HYDROGEN ENGINE

BACKGROUND OF THE INVENTION

The present invention relates to a control device of a hydrogen engine in which a hydrogen fuel and at least one of fossil fuels such as gasoline, gas oil, natural gas, etc are used, and more specifically a technical filed of a control device of a hydrogen engine which is equipped with a NOx trap catalyst disposed in an exhaust passage.

Conventionally, the engine for a vehicle is equipped with a three-way catalyst which purifies CO (carbon monoxide), HC (hydrocarbon), NOx (nitrogen oxide) and so on in an exhaust gas. However, since a lean-burn type of engine has been recently developed to improve the fuel economy, the above-described three-way catalyst whose purifying window is somewhat limited to a small range around a stoichiometric air-fuel ratio could not purify NOx properly in the exhaust gas including excessive oxygen for such a lean-burn engine.

Herein, the NOx tarp catalyst is known as a catalyst disposed in the exhaust passage which functions in such a manner that it traps (absorbs) NOx in the exhaust gas thereat when the air-fuel-ratio state of the exhaust gas is lean (in an oxygen excessive state), whereas it releases (discharges) the trapped NOx therefrom when the air-fuel-ratio sate of the exhaust gas is rich (in an oxygen deficient state). By using this NOx trap catalyst and by properly controlling the air-fuel ratio of the exhaust gas, NOx is trapped (absorbed) at the NOx trap temporarily in the lean state and then the trapped NOx is released (discharged) in the rich state for reacting on CO and HC which exist excessively in the exhaust gas, so that NOx can be properly restrained from being emitted outside. Namely, the NOx emission can be properly reduced for the lean bun engine.

Japanese Patent Laid-Open Publication No. 10-311235 discloses this kind of exhaust purification device of an engine. This exhaust purification device includes the NOx trap catalyst in the exhaust passage, and when the amount of tapped NOx exceeds a specified value, the air-fuel ratio is made rich and the trapped NOx is released thereby. Herein, this rich control is made in such a manner that the air-fuel ratio is made rich intensively at the beginning of NOx release and then the rich degree is gradually decreased. According to the above-described rich control, the NOx release and NOx purification with CO and HC can be properly achieved.

Meanwhile, a hydrogen engine using a hydrogen fuel instead of the above-described fossil fuels or a hybrid type of hydrogen engine using both the hydrogen fuel and the fossil fuel have been recently proposed for an environmental protection. Japanese Patent Laid-Open Publication No. 7-97906 discloses an exemplified engine of this hydrogen engine. This engine includes a hydrogen fuel injector for supplying the hydrogen fuel into the combustion chamber as well as a gasoline fuel injector for supplying the gasoline fuel, in which the fuel injectors are selectable in using based on the engine operating condition.

Herrin, the above-described hydrogen engine has a problem that there may occur an inappropriate burning, for example, when the rich air-fuel-ratio control is executed to release the trapped NOx from the NOx catalyst during the lean burn engine operation with the hydrogen fuel. Namely, since the hydrogen fuel has a higher combustible reaction speed than the fossil fuel, such a rich combustion of hydrogen may cause the inappropriate burning, resulting in improper vibrations or noises, like an engine knocking, occurring.

The present invention has been devised in view of the above-described problem, and an object of the present invention is to provide a control device of a hydrogen engine in which any improper vibrations or noises can be restrained from occurring when the rich air-fuel-ratio control is executed to release the trapped NOx from the NOx trap catalyst.

SUMMARY OF THE INVENTION

According to the present invention, there is provided a control device of a hydrogen engine, comprising a NOx trap catalyst disposed in an exhaust gas passage, the NOx trap catalyst trapping NOx in an exhaust gas when the exhaust gas is in a lean air-fuel-ratio state and releasing a trapped NOx when the exhaust gas is in a rich air-fuel-ratio state including a substantially stoichiometric air-fuel ratio, a first fuel supply means for supplying a fossil fuel into a combustion chamber, a second fuel supply means for supplying a hydrogen fuel into the combustion chamber, an engine operation detecting means for detecting an engine operating condition, a fuel ratio changing means for changing a ratio of the fossil fuel supplied into the combustion chamber relative to the hydrogen fuel supplied based on the engine operating condition detected by the engine operation detecting means, a NOx release determining means for determining whether it is required for the NOx trapped at the NOx trap catalyst to be released based on a state of the trapped NOx at the NOx trap catalyst, a NOx releasing means for releasing the NOx trapped at the NOx trap catalyst by making the air-fuel ratio of the exhaust gas in the rich state when the NOx releasing requirement is determined by the NOx release determining means, a fossil-fuel ratio increasing means for increasing the ratio of the fossil fuel supplied into the combustion chamber relative to the hydrogen fuel supplied when the NOx releasing requirement is determined by the NOx release determining means and the air-fuel-ratio rich control by the NOx releasing means is executed.

Accordingly, when the NOx releasing requirement is determined, i.e., a specified (predetermined or predeterminable) condition based on, e.g., an accumulated time period during the lean engine operation, is satisfied, the ratio of the fossil fuel supplied is increased by the fossil-fuel ratio increasing means, thereby reducing the ratio of the hydrogen fuel relative to the whole fuel when the air-fuel-ratio rich control by the NOx releasing means is executed. Thus, the rich combustion of hydrogen can be properly restrained and any improper vibrations or noises can be restrained from occurring thereby. Particularly, according to a control in which the hydrogen fuel is usually used and the fuel is switched to the fossil fuel only for the NOx release, an emission of unburned elements, such as CO, HC and so on, which are generated by the combustion of the fossil fuel, can be properly restrained and a consumption of the fossil fuel can be reduced.

According to a preferred embodiment, the above-described fuel ratio changing means is configured so as to switch the fuel supplied between the fossil fuel only and the hydrogen fuel only based on the engine operating condition, and the above-described fossil-fuel ratio increasing means is configured so as to switch the fuel supply from the hydrogen fuel only to the fossil fuel only when the above-described NOx releasing requirement is determined by the NOx release determining means and the air-fuel-ratio rich control by the NOx releasing means is executed, in a current engine operating state where only the hydrogen fuel is supplied into the combustion chamber.

Accordingly, since the fuel is changed to the fossil fuel only by switching the fuel when the NOx releasing requirement is determined by the NOx release determining means and the air-fuel-ratio rich control by the NOx releasing means is executed in the current engine operating state where only the hydrogen fuel is supplied into the combustion chamber, any improper vibrations or noises caused by the inappropriate burning of hydrogen can be prevented from occurring.

According to another preferred embodiment, the fuel ratio changing means is configured so as to switch the fuel supplied between the fossil fuel only and both the fossil fuel and the hydrogen fuel based on the engine operating condition, and the fossil-fuel ratio increasing means is configured so as to increase the ratio of the fossil fuel supplied into the combustion chamber relative to the hydrogen fuel supplied when the NOx releasing requirement is determined by the NOx release determining means and the air-fuel-ratio rich control by the NOx releasing means is executed, in a current engine operating state where both the fossil fuel and the hydrogen fuel are supplied into the combustion chamber.

Accordingly, since the combustion of hydrogen is prevented or restrained by switching to the fossil fuel only or increasing the ratio of the fossil fuel supplied when the NOx releasing requirement is determined by the NOx release determining means and the air-fuel-ratio rich control by the NOx releasing means is executed in the current engine operating state where both the fossil fuel and the hydrogen fuel are supplied into the combustion chamber, any improper vibrations or noises caused by the burning of hydrogen can be restrained from occurring.

According to another preferred embodiment, the fuel ratio changing means is configured so as to change the fuel supplied among the fossil fuel only, the hydrogen fuel only and both the fossil fuel and the hydrogen fuel based on the engine operating condition, and the fossil-fuel ratio increasing means is configured so as to increase the ratio of the fossil fuel supplied into the combustion chamber relative to the hydrogen fuel supplied or change to the fossil fuel only when the NOx releasing requirement is determined by the NOx release determining means and the air-fuel-ratio rich control by the NOx releasing means is executed, in a current engine operating state where both the fossil fuel and the hydrogen fuel are supplied into the combustion chamber, whereas the fossil-fuel ratio increasing means is configured so as to change the fuel supply to the fossil fuel only or both the fossil fuel and the hydrogen fuel when the NOx releasing requirement is determined by the NOx release determining means and the air-fuel-ratio rich control by the NOx releasing means is executed, in a current engine operating state where only the hydrogen fuel is supplied into the combustion chamber.

Accordingly, since the combustion of hydrogen is prevented or restrained by increasing the ratio of the fossil fuel supplied or changing to the fossil fuel only when the NOx releasing requirement is determined by the NOx release determining means and the air-fuel-ratio rich control by the NOx releasing means is executed in the current engine operating state where both the fossil fuel and the hydrogen fuel are supplied into the combustion chamber, or by changing the fuel supply to the fossil fuel only or both the fossil fuel and the hydrogen fuel when the NOx releasing requirement is determined by the NOx release determining means and the air-fuel-ratio rich control by the NOx releasing means is executed in the current engine operating state where only the hydrogen fuel is supplied into the combustion chamber, any improper vibrations or noises caused by the burning of hydrogen can be restrained from occurring.

According to another preferred embodiment, the control device further comprises an acceleration detecting means for detecting an engine acceleration, and the air-fuel ratio of the fuel supplied into the combustion chamber is made rich when the engine acceleration is detected by the acceleration detecting means, without changing the fuel ratio set by the fuel ratio changing means.

Accordingly, since in general the combustion of hydrogen during the engine acceleration operation dose not affect the vibrations or noises so much, i.e., it causes little uncomfortable torque shock to passengers, by making the air-fuel ratio of the fuel supplied rich without changing the fuel ratio set by the fuel ratio changing means during the engine acceleration operation, the emission of unburned elements such as CO, HC generated by the combustion of the fossil fuel, which might be unnecessarily increased otherwise, can be prevented and the unnecessary consumption of the fossil fuel can be prevented.

According to another preferred embodiment, the control device further comprises a sulfur-poisoning detecting means for detecting a parameter relating to a degree of sulfur-poisoning of said NOx trap catalyst, and a sulfur releasing means for releasing sulfur attached to the NOx trap catalyst by making the air-fuel ratio of the exhaust gas in a rich state when the degree of sulfur-poisoning detected by the sulfur-poisoning detecting means is greater than a specified value, wherein the fuel ratio changing means is configured so as to change the fuel ratio in such a manner that the ratio of the hydrogen fuel supplied into the combustion chamber relative to the gasoline fuel supplied during a first specified time period from a start of the air-fuel-ratio rich control by the sulfur releasing means is greater than that during a second time period after the first specified time period has passed.

Accordingly, since the fuel ratio is changed in such a manner that the ratio of the hydrogen fuel during the first specified time period from the start of the air-fuel-ratio rich control is greater than that during the second time period after the first specified time period has passed, the exhaust-gas temperature can be increased promptly by the combustion of hydrogen with the high combustible reaction speed for a while, thereby furthering the releasing (discharging) of sulfur from the NOx trap catalyst. Further, the start timing of the sulfur releasing can be advanced substantially, resulting in a shortened time period of the air-fuel-ratio rich control. As a result, the fuel economy can be improved. Also, an improper emission of $H_2S$ can be restrained by suppressing the combustion of hydrogen after a while.

According to another preferred embodiment, the control device further comprises an exhaust-gas temperature detecting means for detecting a parameter relating to a temperature of the exhaust gas, and the fuel ratio changing means is configured such that the first specified time period for a low exhaust-gas-temperature state is set to be longer than that for a high exhaust-gas-temperature state.

Accordingly, since the first specified time period for the low exhaust-gas-temperature state is set to be longer than that for a high exhaust-gas-temperature state, the exhaust-gas temperature can be increased promptly and sufficiently for the NOx release.

According to another preferred embodiment, the control device further comprises the exhaust-gas temperature detecting means for detecting the parameter relating to the temperature of the exhaust gas, and the increasing of the hydrogen-fuel ratio supplied into the combustion chamber by the fuel ratio changing means is configured so as to be restrained in a high exhaust-gas-temperature state, compared with in a low exhaust-gas-temperature state.

Accordingly, since the increasing of the hydrogen-fuel ratio supplied is configured so as to be restrained in the high exhaust-gas-temperature state, i.e., the combustion of the hydrogen fuel for increasing the exhaust gas temperature is restrained properly, the improper emission of $H_2S$ can be prevented.

Other features, aspects, and advantages of the present invention will become apparent from the following description which refers to the accompanying drawings.

BRIEF DESCRIPTION OF THE DRAWINGS

FIGS. 2A through 2F are explanatory diagrams of trapping and releasing of NOx and SOx at a NOx trap catalyst.

DETAILED DESCRIPTION OF THE INVENTION

Hereinafter, preferred embodiments of the present invention will be described referring to the accompanying drawings. It should be understood that even though embodiments are separately described, single features thereof may be combined to additional embodiments.

Figure 1:
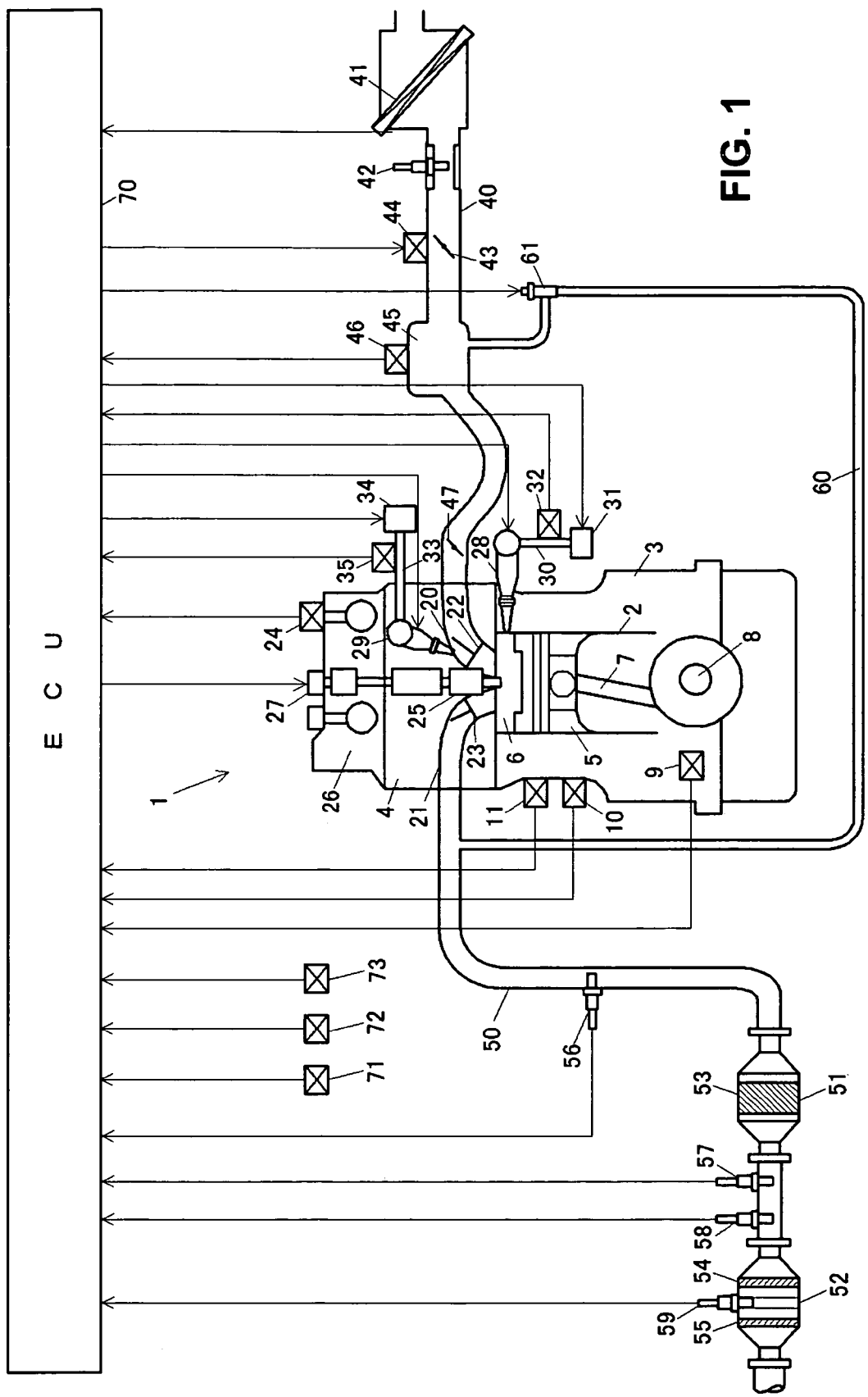
FIG. 1 is a system structural diagram of an engine according to an embodiment of the present invention.

FIG. 1 illustrates an entire structure of an engine 1. This engine 1 is a hydrogen engine in which gasoline and hydrogen are used as an engine fuel, comprising a cylinder block 3 including a plurality of cylinders 2 ... 2 (only one is illustrated) which are disposed in line, and a cylinder head 4 which is disposed above the cylinder block 3. Pistons 5 are disposed in respective cylinders 2 so as to reciprocate therein, and a combustion chamber 6 is formed between a top face of the cylinder 2 and a lower face of the cylinder head 4 in each cylinder 2. A reciprocating movement of the piston 5 is transferred to a rotational movement of a crankshaft 8 via a connecting rod 7. Also, at the cylinder block 3 are provided an electromagnetic type of crank angle sensor 9 to detect the rotational angle of the crankshaft 8, a knocking sensor 10 to detect the engine knocking based on fluctuation in combustion pressure in each cylinder 2, and an engine temperature sensor 11 to detect the temperature of an engine coolant in an engine water jacket (not illustrated).

Meanwhile, an intake port 20 and an exhaust port 21 are formed at the cylinder head 4 so as to face the combustion chamber 6 of each cylinder 2, and an intake valve 22 and an exhaust valve 23 are provided at respective opening portions of these ports 20 and 21. These valves 22 and 23 are respectively driven to open and close by an intake camshaft and an exhaust camshaft (not illustrated) which are rotatably supported on the cylinder head 4, being synchronized with the rotation of the crankshaft 8. Also, at the intake camshaft is provided an electromagnetic type of cam angle sensor 24 to detect the rotational angle of the intake camshaft. Further, an ignition plug 25 is provided at each cylinder 2 so as to penetrate the cylinder head 4 vertically and be enclosed by the intake and exhaust valves 22 and 23. An electrode at a tip of the ignition plug 25 projects a little below the ceiling face of the combustion chamber 6, and a base end of the ignition plug 25 is coupled to an igniter circuit 27 which is disposed so as to penetrate a head cover 26.

A peripheral portion of the top face of the piston 5 constituting the bottom of the combustion chamber 6 is formed substantially in parallel to the ceiling face of the combustion chamber 6, while a central portion thereof has a recess with a certain shape like a lemon, when viewed from above. Also, at an intake-side peripheral portion of the combustion chamber 6 is provided a hydrogen injector 28 to inject the hydrogen fuel into the combustion chamber 6. Meanwhile, at the intake port 20 is provided a gasoline injector 29 to inject the gasoline fuel (other fossil fuel may be used including gas oil, natural gas, etc.) into the intake port 20.

The hydrogen injector 28 is coupled to a hydrogen fuel distribution pipe 30 at its base end, which is common to all of the cylinders 2, and the hydrogen fuel supplied from a high-pressured hydrogen fuel pump 31 is distributed to each hydrogen injector 28 at the cylinders 2. Herein, when the hydrogen is injected by the hydrogen injector 28 in the compression stroke of the engine, an injection spray of the hydrogen fuel is so controlled by an intake flow in the combustion chamber 6 as to locate the hydrogen mixture with an appropriate concentration around the ignition plug 25. Herein, a hydrogen fuel pressure sensor 32 to detect the pressure of hydrogen fuel injected by the hydrogen injector 28 is provided at the hydrogen fuel distribution pipe 30.

Meanwhile, the gasoline injector 29 is coupled to a gasoline fuel distribution pipe 33 at its base end, which is common to all of the cylinders 2, at its base end, and the gasoline supplied from a high-pressured fuel pump 34 is distributed to each gasoline injector 29 at the intake port 20 of the cylinders 2. Herein, when it is injected by the gasoline injector 29 in the compression stoke of the engine, the gasoline is taken into the combustion chamber 6 by the intake flow. Herein, a gasoline fuel pressure sensor 35 to detect the pressure of gasoline injected by the gasoline injector 29 is provided at the gasoline fuel distribution pipe 33.

The hydrogen fuel is directly injected into the combustion chamber 6 by the hydrogen injector 28 and the gasoline fuel is injected into the intake port 20 by the gasoline injector 29. However, the hydrogen fuel may be injected into the intake port 20, while the gasoline fuel may be directly injected into the combustion chamber 6. Also, both the hydrogen and gasoline fuel may be directly injected into the combustion chamber 6, or both the hydrogen and gasoline fuel may be injected into the intake port 20. Herein, when the hydrogen fuel is injected into the intake port 20 by the hydrogen injector 28, there may be a case where the hydrogen fuel is burned in the intake port 20 before being taken into the combustion chamber 6 due to its high combustibility.

At one side of the engine 1 (the right-side face in the figure) is provided an intake passage 40 so as to connect with each intake port 20 of the cylinders 2. The intake passage 40, which supplies an intake air that has been filtered at an air cleaner 41 to the combustion chamber 6 of the engine 1, comprises a hot-wire-type air flow sensor 42 to detect the amount of intake air supplied to the engine 1, an electronically-controlled throttle valve 43 to control the passage area of the intake passage 40, a throttle sensor 44 to detect the position of the throttle valve 43, and a serge tank 45, from upstream toward downstream. The throttle valve 43 is not linked mechanically to an accelerator pedal (not illustrated), but controlled electronically by an electric motor (not illustrated). Also, a boost sensor 46 is provided at the serge tank 45 to detect the pressure in the intake passage 40 downstream from the throttle valve 43. Also, the intake passage downstream from the serge tank 45 constitutes independent passages which are branched toward the respective cylinders 2, and respective downstream end portions of these independent passages are further branched into two passages leading to the respective intake ports 20, respectively. Between the independent passages and the branch passages is provided a throttle valve 47 (Tumble Swirl Control Valve, hereinafter, referred to as "TSCV") to adjust the strength of the intake flow in the combustion chamber 6. This TSCV is controlled by, e.g., a stepping motor or the like. The TSCV 47 has a valve body at which a notch is formed. When the valve 47 is fully closed, the intake air is supplied only via this notch, so that a strong swirl can be formed in the combustion chamber 6. Meanwhile, as the TSCV 47 is opened, the intake air comes to be supplied via another portion than the notch, and the strength of the swill formed in the combustion chamber 6 decreases gradually thereby.

At the other side of the engine 1 (the left-side face in the drawing) is provided an exhaust passage 50 to exhaust burned gas (exhaust gas) from each combustion chamber 6 of the cylinders 2. An upstream side of the exhaust passage 50 is formed by an exhaust manifold leading to each intake port 20 of the cylinders 2. At the exhaust passage 50 downstream from the exhaust manifold are provided two catalyst converters 51 and 52 in line which purify HC (hydrocarbon), CO (carbon monoxide) and NOx (nitrogen oxide) in the exhaust gas.

An upstream catalyst converter 51 includes a carrier with a honeycomb structure in a casing, which is not illustrated in detail here. A catalyst layer of a so-called three-way catalyst 53 is formed on wall faces of respective holes of the carrier. This three-way catalyst 53 enables to purify HC, CO and NOx when the exhaust gas is in a state including a substantially stoichiometric air-fuel ratio.

Also, a downstream catalyst converter 52 includes two carriers disposed in line in single casing. The upstream carrier includes a so-called NOx absorbent type of catalyst layer which is formed on wall faces of respective holes of the carrier, constituting an upstream NOx trap catalyst 54. Likewise, the downstream carrier also includes the NOx absorbent type of catalyst layer, constituting a downstream NOx trap catalyst 55. Herein, these NOx trap catalysts 54 and 55 respectively contain barium as a major catalytic metal element, carried by a compound from element groups of alkali metal, alkaline earths metal, or rare earth, such as kalium, magnesium, strontium or lanthanum, and a precious metal having a chemically catalytic action, such as platinum. Accordingly, each of the catalysts functions in such a manner that it traps (absorbs) NOx in the exhaust gas thereat when the air-fuel-ratio state of the exhaust gas is leaner relative to the stoichiometric air-fuel ratio, whereas it releases (discharges) the trapped NOx therefrom and reduces it when the air-fuel-ratio sate of the exhaust gas is made richer instead (NOx release control).

Figure 2A:
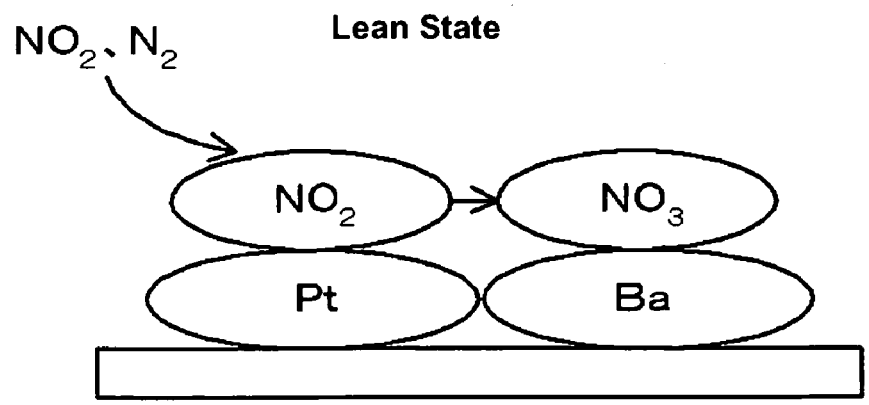
Figure 2B:
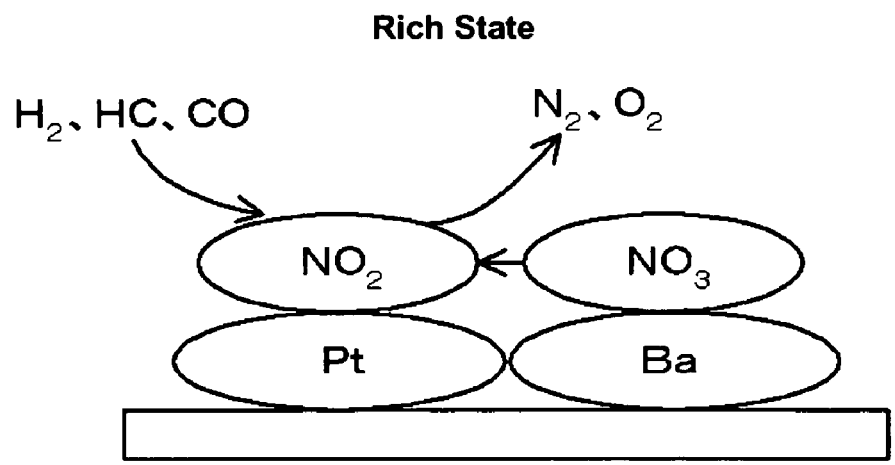

Specifically, the mechanism of the trapping and releasing of the NOx trap catalysts 54 and 55 is considered as follows. Namely, as schematically illustrated in FIG. 2A, when the air-fuel ratio of the exhaust gas is in the lean state, NOx reacts to Oxygen $O_2$ which exists excessively in the exhaust gas at the catalyst metals, and part of NOx is coupled to barium and trapped at the catalyst as NOx. Meanwhile, as illustrated in FIG. 2B, when the air-fuel ratio of the exhaust gas in the rich state which is equivalent to the substantially stoichiometric air-fuel ratio or richer than that, an opposite reaction to the reaction in the lean state proceeds such that NOx released from barium reacts to HC and CO in the exhaust gas and NOx is reduced to nitrogen $N_2$ and oxygen $O_2$ (reduction reaction).

Herein, since they contain barium, the NOx trap catalyst 54 and 55 may have a problem of a sulfur-poisoning. Namely, sulfur (SOx) in the fuel is attached to the catalyst. The attached sulfur is not released by the NOx release control, and remaining the sulfur unreleased may deteriorates the capability of NOx purification. Accordingly, a treatment of releasing the sulfur attached to regenerate the catalyst purification capability (SOx release contol), i.e., temperature increase of the NOx trap catalysts 54 and 55 to prevent the sulfur-poisoning may need to be conducted.

This temperature increase of the NOx trap catalysts 54 and 55 can be achieved by increasing the exhaust-gas temperature with a split fuel injection or an ignition timing retard. The sulfur-poisoning progresses faster in the lean state of the air-fuel ratio of exhaust gas than in the rich state. Accordingly, the sulfur releasing can be achieved properly by the SOx release control in which the temperature of the NOx trap catalysts 54 and 55 is increased in the rich air-fuel state.

Specifically, the mechanism of the above-described sulfur-poisoning and sulfur releasing is considered as follows. The NOx and SOx in the oxygen-excess state of exhaust gas react respectively to the oxygen $O_2$ at the catalyst metals, and part of them are coupled to barium and trapped at the catalyst as NOx and Sox (see FIG. 2C). Herein, as described above, when the air-fuel ratio of the exhaust gas changes to the rich state equivalent to the substantially stoichiometric air-fuel ratio or richer, the opposite reaction to the reaction in the lean state proceeds such that NOx released from barium reacts to HC and CO in the exhaust gas and NOx is reduced to nitrogen $N_2$ and oxygen $O_2$. However, the SOx will remain coupled to barium without being released (see FIG. 2D).

During the operation of NOx release control, the sate is repeated between FIGS. 2C and 2D. Herein, the SOx remains coupled to barium and stays on its surface as illustrated in FIG. 2E. Thus, the remaining SOx may prevent the NOx from being trapped at the catalyst when the air-fuel ratio turns to the lean state.

Accordingly, by increasing the temperature of catalyst up to 600 through 650 degrees centigrade and making the air-fuel ratio rich, the SOx remaining on the surface of barium is released, and an effective area of the barium surface enough to trap the NOx can be ensured thereby, as illustrated in FIG. 2F.

There is provided an oxygen sensor (first oxygen sensor) 56 to detect the concentration of oxygen in the exhaust gas near a congregational portion of the exhaust manifold of the engine 1. The detecting signal from this oxygen sensor 56 is mainly used for the air-fuel-ratio feedback control of the engine 1. Further, between the above-described two catalyst converters 51 and 52 are provided a second oxygen sensor to detect a state of deterioration of the upstream three-way catalyst 53 and an exhaust-gas temperature sensor 58 to detect the temperature of the exhaust gas flowing into the NOx trap catalyst 54. Also, a third oxygen sensor 59 is provided between the two NOx trap catalysts 54 and 55.

Also, to the exhaust passage 50 downstream from the above-described exhaust manifold is connected an upstream end of an exhaust gas recirculation passage (hereinafter, referred to as "EGR passage") 60 to recirculate part of the exhaust gas into the intake passage 40. A downstream end of the EGR passage 60 opens to the inside of the serge tank 45. An EGR valve 61 comprising a duty-controlled solenoid vale is provided in the EGR passage 60 near its downstream end. The amount of recirculated exhaust gas via the EGR passage 60 is adjusted by the EGR valve 61.

The above-described ignition circuit 27, hydrogen and gasoline injectors 28 and 29, hydrogen and gasoline high-pressured fuel pumps 31 and 34, throttle valve 43, TSCV 47, EGR valve 61 and so on are all controlled by an engine control unit (hereinafter, referred to as "ECU") 70. Meanwhile, the ECU 70 receives output signals of at least the above-described crank angle sensor 9, knocking sensor 10, temperature sensor 11, air flow sensor 42, throttle sensor 44, three oxygen sensors 56, 57 and 59, exhaust-gas temperature sensor 58 and so on. Also, the ECU 70 receives output signals of an accelerator opening sensor 71 to detect the operating amount of accelerator (hereinafter, referred to as "accelerator opening"), an engine speed sensor 72 to detect the engine speed (rotational speed of the crank angle), and a vehicle speed sensor 73 to detect the vehicle speed.

The ECU 70 controls, based on the above-described signals of the sensors, the air-intake amount of the engine 1, and the fuel injection amount, the fuel injection timing and the ignition timing for each cylinder 2. It further controls the strength of the intake air flow in the cylinders 2, the exhaust-gas recirculation ratio and so on. Specifically, as illustrated in a control map of FIG. 3, a hydrogen lean region is set at a low-load and low-speed engine operation area when the engine is warmed up, where the hydrogen fuel is injected by the hydrogen injector 28 in the engine compression stroke so as to locate the hydrogen fuel around the ignition plug 25 and the hydrogen lean burn is achieved by burning the stratified hydrogen. Meanwhile, a higher-load and higher-speed engine operation area than the above-described hydrogen lean region is a region for a so-called homogeneous burn, where the gasoline fuel is injected by the gasoline injector 29 mainly in the engine intake stroke so as to mixture sufficiently the gasoline fuel injected with air in the combustion chamber and the mixture is burned after such a substantially homogenous mixture has been generated thereby.

Next, the operation and effects of the present embodiment will be described.

Figure 3:
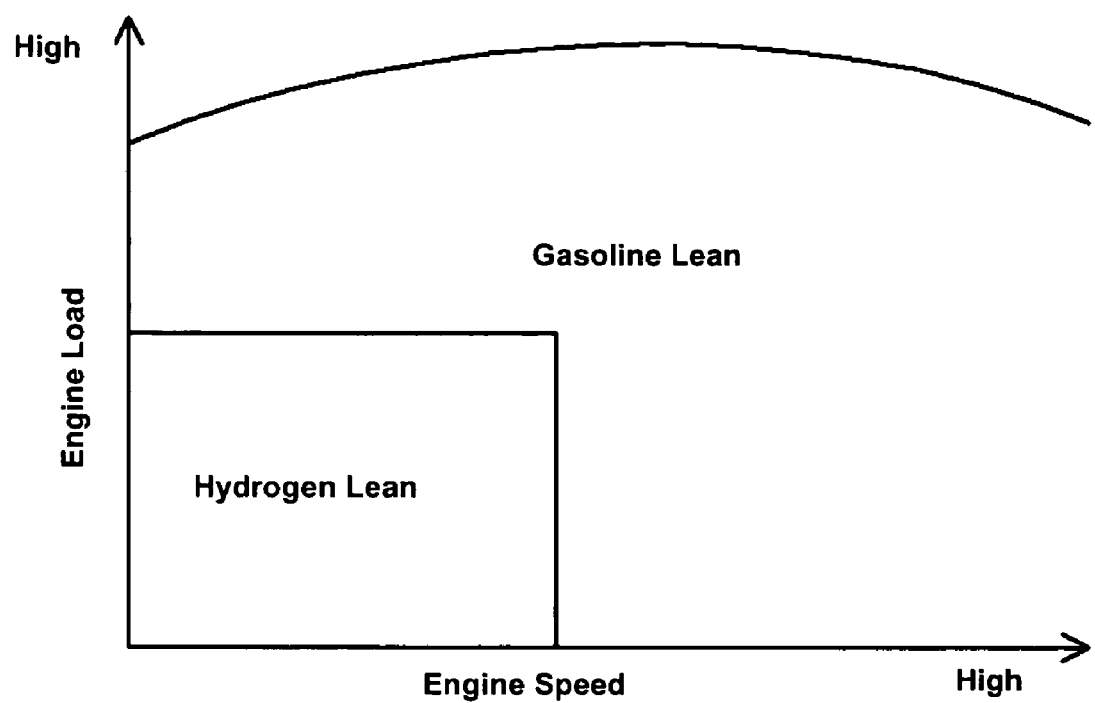
FIG. 3 is a control map according to a first embodiment of the present invention.
Figure 4:
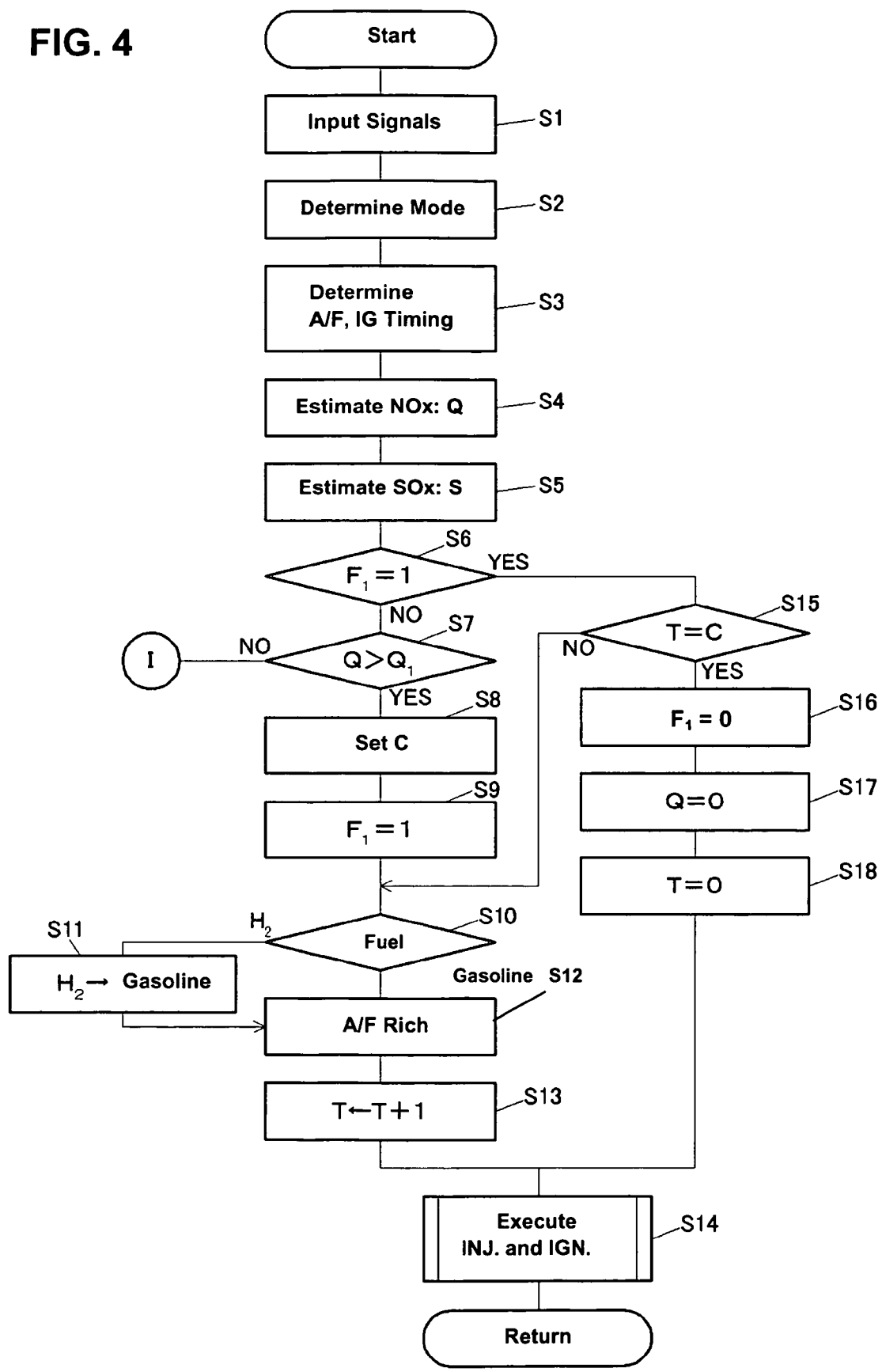
FIG. 4 is a flowchart showing part of control steps according to the first embodiment.
Figure 5:
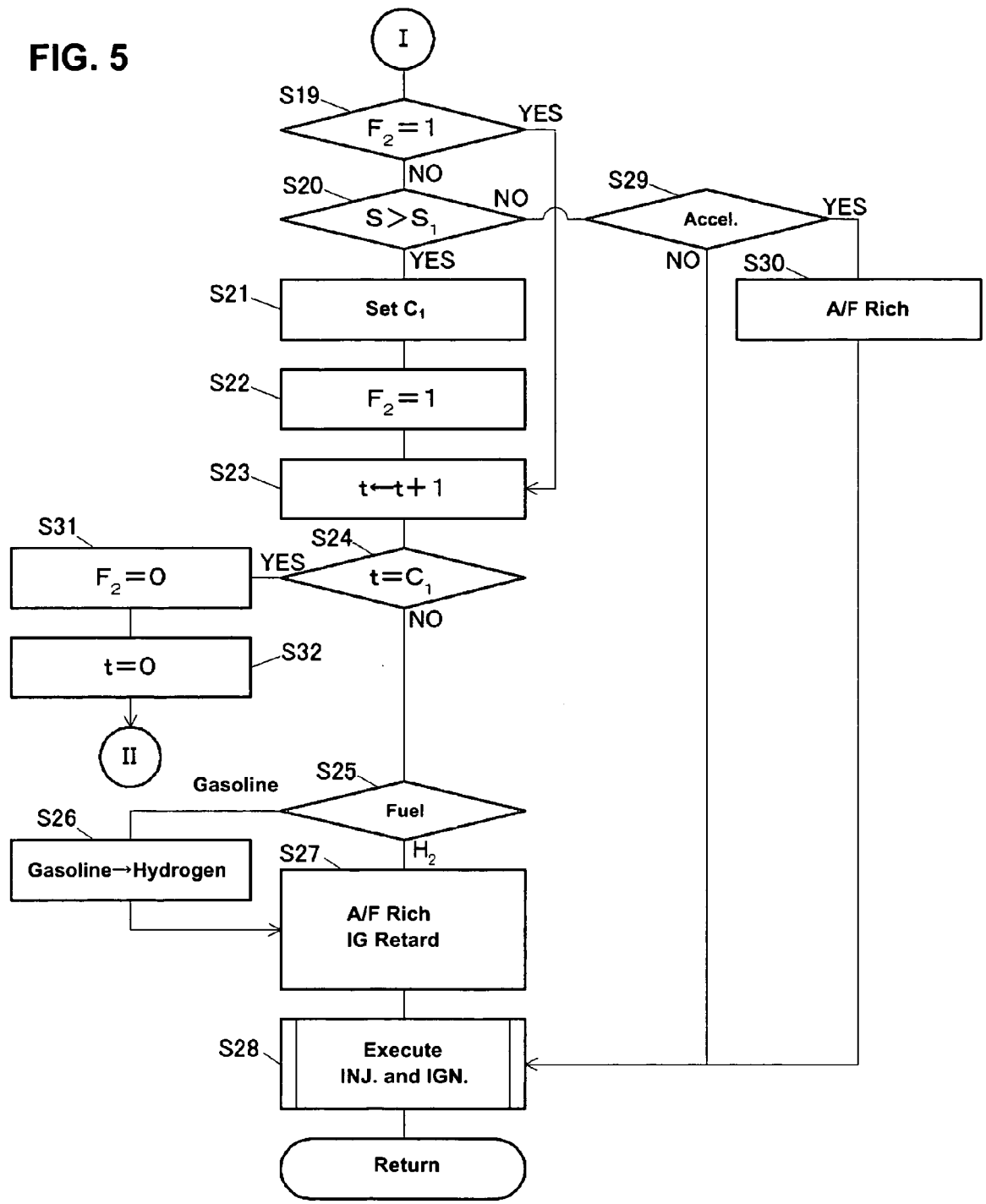
FIG. 5 is a flowchart showing part of control steps according to the first embodiment.
Figure 6:
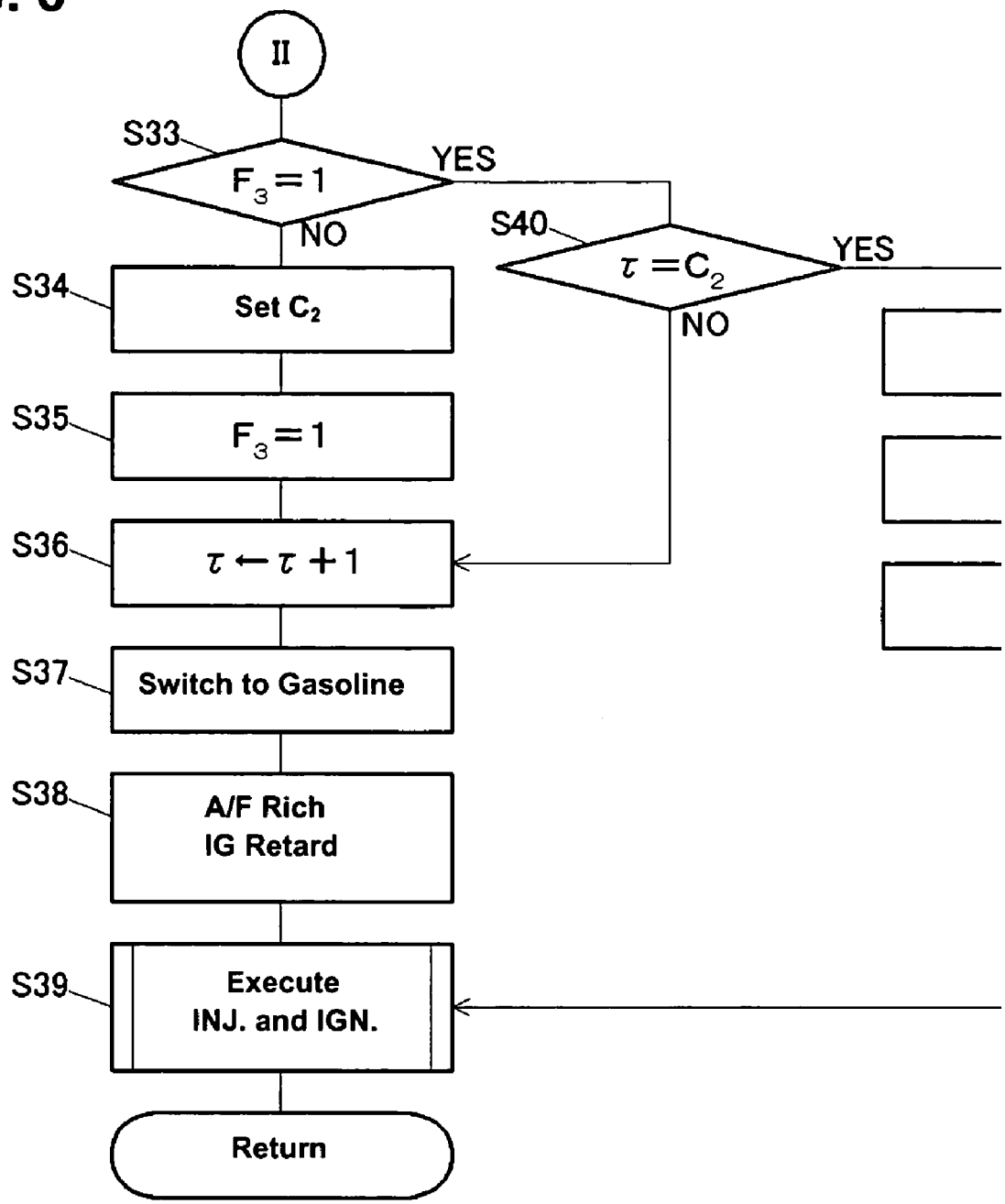
FIG. 6 is a flowchart showing part of control steps according to the first embodiment.

Flowcharts illustrated in FIGS. 4 through 6 show specific steps of the NOx release control and SOx release control by the ECU 70 of the hydrogen engine equipped with the control map of FIG. 3. The engine operation mode comprises the hydrogen lean region where the hydrogen is used as the fuel at the low-load and low-speed operation area, and the gasoline lean region where the gasoline is used as the fuel at the high-load and high-speed operation area. And, there is provided a condition for starting the NOx release control which requires at least either that the amount of trapped NOx to be estimated based on an accumulated time period during the lean engine operation after the previous NOx release becomes more than a first specified value $Q_1$, or that a specified great acceleration is detected. There is also provided a condition for starting the SOx release control which requires at least that the amount of SOx sulfur-poisoning to be estimated based on an accumulated time period (which is five to ten times as great as the accumulated time period for the NOx release control) during the lean engine operation after the previous SOx release becomes more than a second specified value $S_1$.

In a flowchart of FIG. 4, at first respective signals of the engine temperature sensor 11, cam angle sensor 24, airflow sensor 41, oxygen sensors 56, 57 and 59, accelerator opening sensor 71, engine speed sensor 72 and so on are inputted in step S1, and data stored temporarily in RAM of the ECU 70 is inputted. Subsequently, in step S2, the present operation mode of the engine 1 is determined by the control map of FIG. 3 based on a target engine torque and the engine speed of the engine 1. Herein, the target engine torque, which is equivalent to the state of load of the engine 1, is determined by use of, for example, a map which has been previously obtained through an experiment, based on the present engine speed detected by the engine speed sensor 72 and the present accelerator opening detected by the accelerator opening sensor 71.

Then, in step S3, the air-fuel ratio (A/F) and the ignition timing (IG Timing) are determined based on mainly the first oxygen sensor 56. Herein, the air-fuel ratio is determined for a specified engine operation mode such as the engine acceleration such that the controlled lean degree of the fuel ratio is weakened to obtain a sufficiently large torque. In steps S4 and S5, the amount of trapped NOx Q and the amount of SOx sulfur-poisoning S are estimated (calculated) respectively based on the respective accumulated time periods described above, and these are stored in the RAM of the ECU 70 as updated data. This estimation (calculation) of the trapped NOx amount Q is conducted in such a manner that the amount Q is increased during the lean engine operation, while the amount Q is decreased during the rich engine operation or the acceleration operation. Meanwhile, the estimation (calculation) of the SOx sulfur-poisoning amount S is conducted in such a manner that the amount S is increased during the lean engine operation or the rich engine operation, while the amount S is decreased during the rich engine operation and the ignition retard operation.

Then, it is determined whether or not a flag $F_1$ is set at 1 in step S6, and when the flag $F_1$ is 0, the sequence proceeds to step S7. In step S7, a determination is made as to whether or not the trapped NOx amount Q estimated in step S4 is greater than the first specified value $Q_1$ which is predetermined or predeterminable. When the trapped NOx amount Q is not greater than the first specified value $Q_1$, the sequence proceeds to (I) in FIG. 5. When the trapped NOx amount Q is greater than the first specified value $Q_1$, the sequence proceeds to step S8, where the NOx release control is started. In step S8, a NOx release time period C is set, and then the flag $F_1$ is set at 1 in step S9. Subsequently, a determination of the kind of fuel used presently, i.e., hydrogen or gasoline, is made in step S10. When the hydrogen is used, the fuel is changed to the gasoline in step S11 and the air-fuel ratio is controlled to be rich in step S12. Meanwhile, when it is determined that the gasoline is used in step S10, the sequence proceeds to step S12 directly where the air-fuel ratio is controlled to be rich. After the air-fuel ratio is made rich in step S12, a count T is increased by 1 in step S13.

Then, the gasoline injection by the gasoline injector 29 and the ignition (INJ.) with the ignition timing (IGN.) determined in step S3 are executed in step S14, and then the sequence returns.

When the flag $F_1$ is 1 in step S6, it is determined whether or not the count T equals C in step S15. When the count T does not equal C, the sequence proceeds to step S12 for the rich control. When the count T equals C, the sequence proceeds to step S16, where the flag $F_1$ is reset at 0, and then the trapped NOx amount Q estimated in step S4 is reset at 0 in step S17, and the count T is reset at 0 in step S18. Then, the fuel injection by either one of the hydrogen and gasoline injectors 28, 29 according to the determination in step S2 based on the control map of FIG. 3 and the ignition with the ignition timing determined in step S3 are executed in step S14, and then the sequence returns.

When the trapped NOx amount Q is not greater than $Q_1$ in step S7, the sequence proceeds to step S19 of FIG. 5. Namely, it is determined whether or not a flag $F_2$ is 1 in this step S19. When the flag $F_2$ is not 1, it is determined whether or the SOx sulfur-poisoning amount S is greater than the second specified value $S_1$ in step S20. When the SOx sulfur-poisoning amount S is greater than the second specified value $S_1$, the SOx release control is started. First, an initial specified time period $C_1$ is set in step S21. Herein, this initial specified time period $C_1$ is set based on mainly the exhaust gas temperature detected by the exhaust-gas temperature sensor 58. This setting is done such that the higher the exhaust-gas temperature is, the shorter the initial specified time period $C_1$ is set at (including zero). Then, the flag $F_2$ is set at 1 in step S22, and a count t is increased by 1 in step S23. Next, it is determined whether or not the count t equals the above-described initial specified time period $C_1$ in step S24. When the count t does not equal the initial specified time period $C_1$, the sequence proceeds to step S25.

When the gasoline is determined as the presently used fuel in step S25, the fuel is changed from the gasoline to the hydrogen in step S26, and the air-fuel ratio is set to be rich and the ignition timing is set to be retarded in step S27. Then, the hydrogen injection by the hydrogen injector 28 and the ignition with the retarded ignition timing set in step S27 are executed in step S28, and the sequence returns.

Meanwhile, when the SOx sulfur-poisoning amount S is not greater than the second specified value $S_1$ in step S20, it is determined as to the engine acceleration operation in step S29. When it is determined that the engine acceleration occurs, the air-fuel ratio is controlled to be rich in step S30. Then, the fuel injection by either one of the hydrogen and gasoline injectors 28, 29 according to the determination in step S2 based on the control map of FIG. 3 and the ignition with the ignition timing determined in step S3 are executed in step S28, and then the sequence returns. Namely, when the acceleration occurs, the air-fuel ratio is made rich regardless of the kind of fuel used presently. Meanwhile, when no acceleration occurs, the fuel injection and the ignition are executed likewise without making the air-fuel ratio rich, and then the sequence returns.

When the count t equals $C_1$ in step S24, the flag $F_2$ is set at 0 in step S31 and the count t is reset at 0 in step S32, and then the sequence proceeds to (II) of FIG. 6.

In a flowchart of FIG. 6, it is determined whether or not a flag $F_3$ is 1 in step S33. When the flag $F_3$ is not 1, a terminal specified time period $C_2$ is set in step S34, the flag $F_3$ is set at 1 in step S35, and a count τ is increased by 1 in step S36. Then, the fuel to be used is changed to the gasoline in step S37. The air-fuel ratio is set to be rich and the ignition timing is set to be retarded in step S38. Then, the gasoline injection by the gasoline injector 29 and the ignition with the retarded ignition timing set in step S38 are executed in step S39, and the sequence returns.

Meanwhile, when the flag $F_3$ is 1 in step S41, it is determined whether or not the count τ equals the terminal specified time period $C_2$ in step S40. When the count τ does not equal the terminal specified time period $C_2$, the sequence proceeds to step S36 and then steps S37 through S39 for the execution of the air-fuel and timing control, finally returning. When the count τ equals the terminal specified time period $C_2$, the flag $F_3$ is reset at 0 in step S41, the SOx sulfur-poisoning amount S is reset at 0 in step S42, the count τ is reset at 0, and then the sequence proceeds to step S39. Then, the fuel injection by either one of the hydrogen and gasoline injectors 28, 29 according to the determination in step S2 based on the control map of FIG. 3 and the ignition with the ignition timing determined in step S3 are executed, and the sequence returns.

Figure 7:
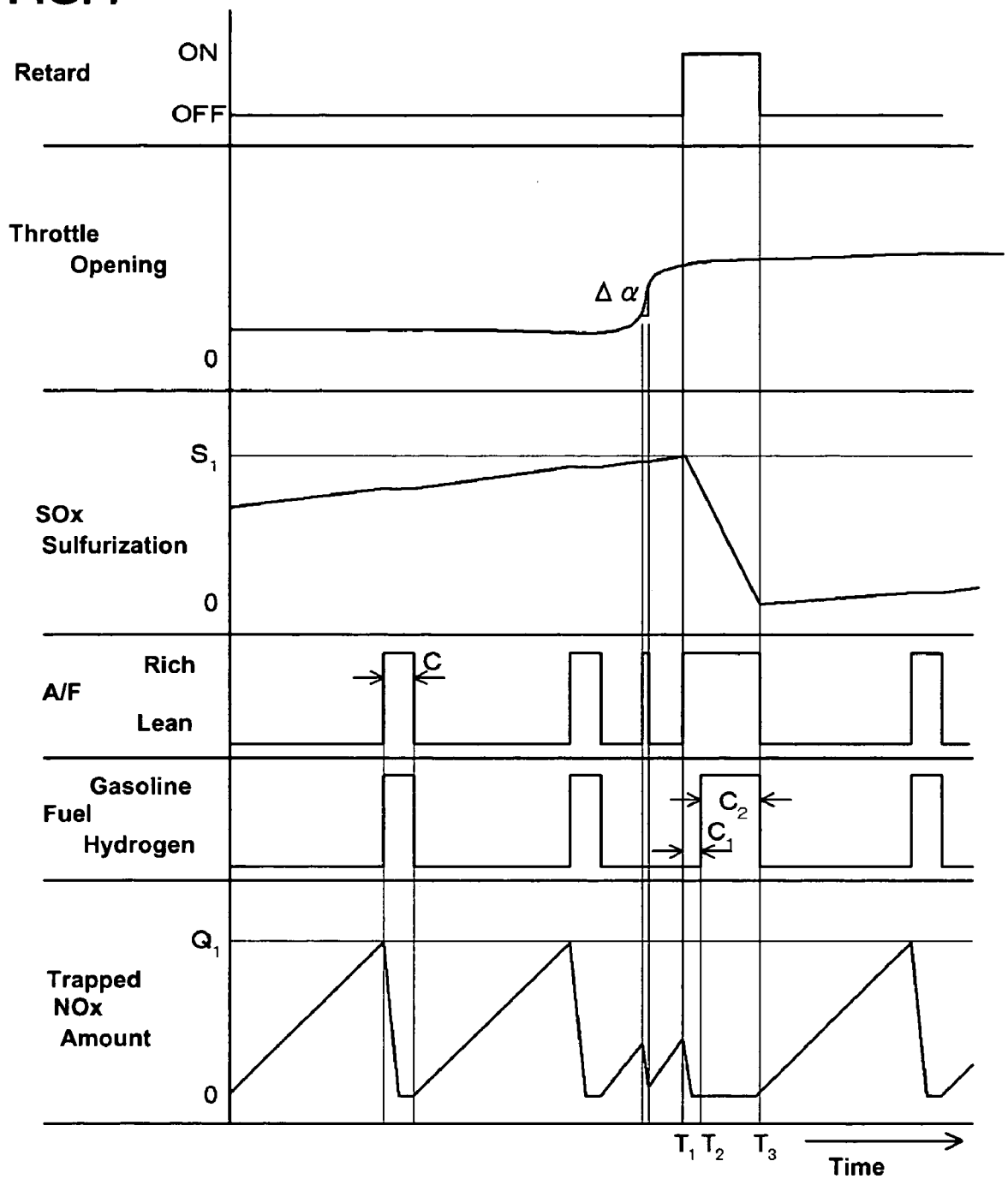
FIG. 7 is a time chart showing controls of an air-fuel ratio and fuels supplied according to the first embodiment.

Next, the control by the flowcharts of FIGS. 4 through 6 will be described with a time chart of FIG. 7. When the trapped NOx amount Q increases with the lapse of time and during the hydrogen lean engine operation and it has reached the specified value $Q_1$, the fuel is switched to gasoline from hydrogen and the air-fuel ratio is made rich until the NOx release time period C has passed. Then, after the trapped NOx amount has decreased by this rich air-fuel-ratio control, the fuel is switched again to hydrogen from gasoline and the air-fuel ratio is controlled to be lean.

Herein, when the engine acceleration is detected by the throttle sensor 44 showing an increase ratio of the throttle opening Δα is greater than a specified value, the rich control of air-fuel ratio is executed to generate the sufficient engine torque. Herein, the air-fuel-ratio rich control is conducted for the hydrogen fuel without switching the fuel.

Also, when it is determined that the SOx sulfur-poisoning amount S exceeds the specified value $S_1$ at the time $T_1$, the SOx release control is started by executing the rich-air-fuel control and the ignition retard control. Namely, the air-fuel ratio is controlled to be rich at the time $T_1$. Herein, for the initial specified time period $C_1$ until the time $T_2$, only hydrogen is used as the fuel, and after the lapse of the initial specified time period $C_1$, the fuel is switched to gasoline, remaining the air-fuel ratio rich. This rich air-fuel-ratio engine operation with the gasoline fuel is executed during the terminal specified time period $C_2$. Then, at the time $T_3$ when the SOx sulfur-poisoning amount S becomes almost zero, the air-fuel ratio is controlled to be lean again and the fuel is switched to hydrogen from gasoline. Meanwhile, the ignition retard control is executed to increase the exhaust-gas temperature until the SOx sulfur-poisoning amount S becomes almost zero. Thus, by controlling so as to use the hydrogen fuel during the initial specified time period $C_1$ and the gasoline fuel during the terminal specified time period $C_2$, the prompt increasing of the exhaust-gas temperature can be attained by the combustion of hydrogen with the high combustible reaction speed, and the SOx release from the NOx trap catalysts 54 and 55 can be promoted. Also, sine the gasoline fuel is used during the terminal specified time period $C_2$, any improper vibrations or noises which might be caused by the rich-hydrogen combustion can be restrained.

Figure 8:
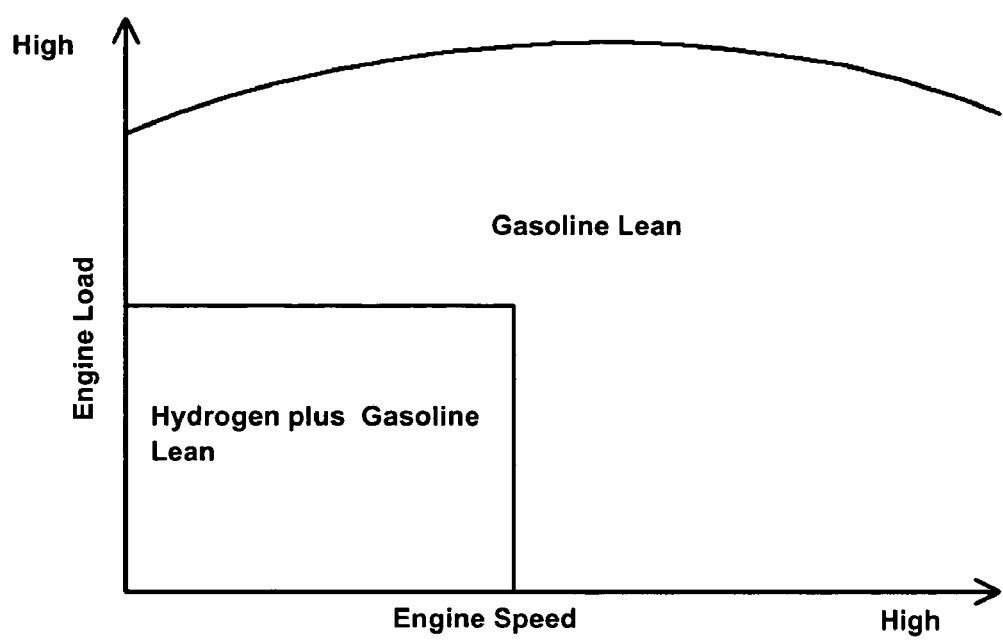
FIG. 8 is a control map according to a second embodiment of the present invention.

Next, the control of the engine 1 equipped a control map illustrated in FIG. 8 according to the second embodiment of the present invention will be described. According to the control map of FIG. 8, a hydrogen-plus-gasoline lean region is set at the low-load and low-speed operation area, where the gasoline fuel is injected by the gasoline injector 29 mainly in the engine intake stroke and the hydrogen fuel is injected by the hydrogen injector 28 in the engine compression stroke so as to generate the substantially homogenous gasoline mixture in the combustion chamber and also locate the hydrogen fuel around the ignition plug 25, thereby achieving the lean bum. Meanwhile, the gasoline lean region is set a higher-load and higher-speed operation area than the above-described region, where the gasoline fuel is used for the homogenous combustion.

Figure 9:
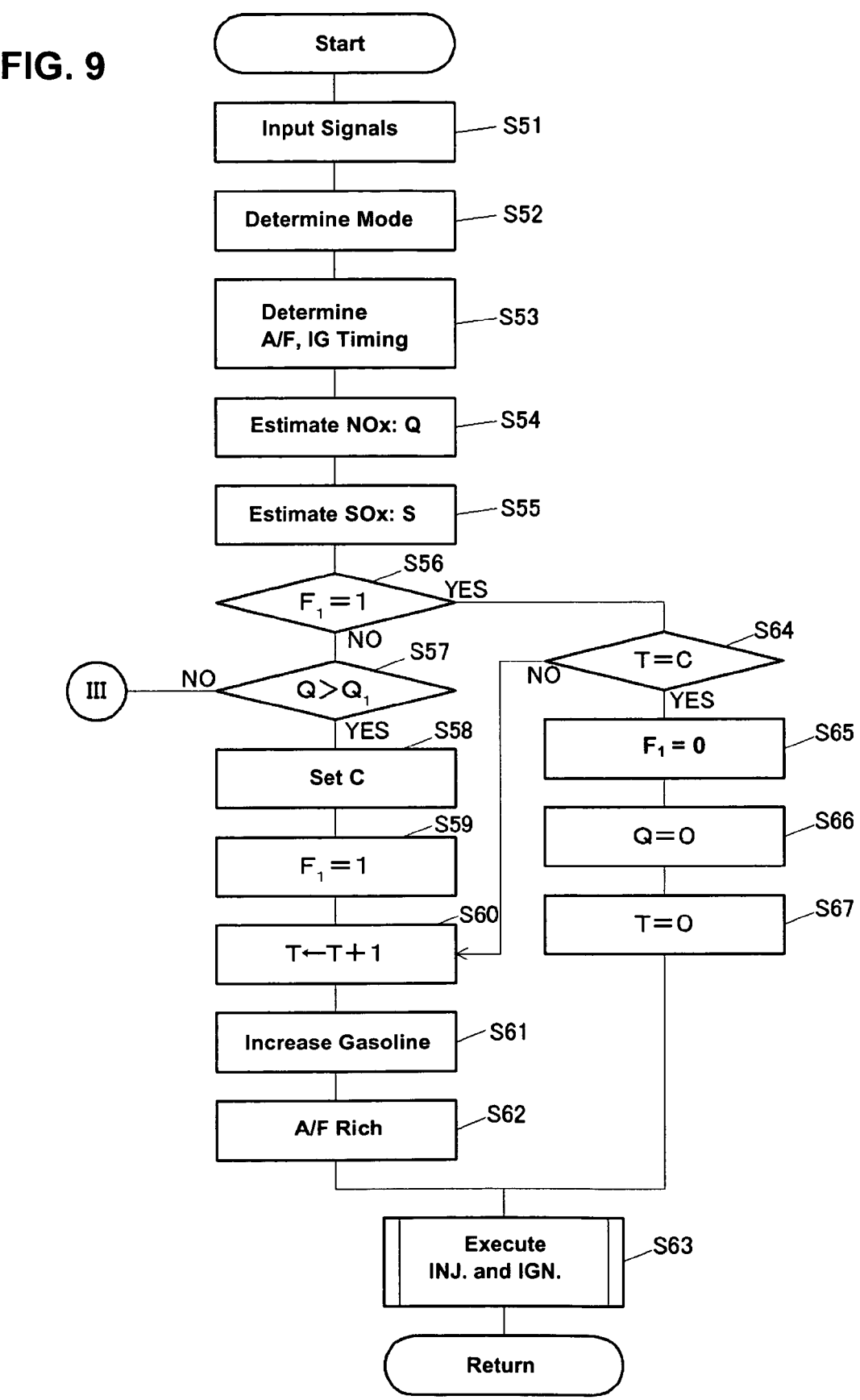
FIG. 9 is a flowchart showing part of control steps according to the second embodiment.

The control steps of the present embodiment will be described referring to flowcharts illustrated in FIGS. 9 through 11. Herein, the same steps as those of FIGS. 4 through 6 perform substantially the same functions, and therefore their specific descriptions are omitted here. The hydrogen-plus-gasoline lean operation using the fuel of both hydrogen and gasoline is executed at the low-load and low-speed engine operation area, while the gasoline lean operation using the fuel of gasoline is executed at the high-load and high-speed engine operation area. The respective conditions for the NOx release and SOx release are the same as those of the above-described first embodiment.

First, in step S51, respective detected signals and data temporarily stored in the RAM are inputted. Subsequently, in step S52, the present operation mode of the engine 1 is determined by the control map of FIG. 8 based on the target engine torque and the engine speed of the engine 1.

Then, in step S53, the air-fuel ratio and the ignition timing are determined. In steps S54 and S55, the amount of trapped NOx Q and the amount of SOx sulfur-poisoning S are estimated (calculated) respectively based on the accumulated time periods of the lean operation after the previous NOx release, and these are stored in the RAM of the ECU 70 as updated data.

Then, it is determined whether or not a flag $F_1$ is set at 1 in step S56, and when the flag $F_1$ is 0, the sequence proceeds to step S57. In step S57, the determination is made as to whether or not the trapped NOx amount Q estimated in step S54 is greater than the first specified value $Q_1$ which is predetermined. When the trapped NOx amount Q is not greater than the first specified value $Q_1$, the sequence proceeds to (III) in FIG. 10. When the trapped NOx amount Q is greater than the first specified value $Q_1$, the sequence proceeds to step S58. In step S58, the NOx release time period C is set, and then the flag $F_1$ is set at 1 in step S59, and then the count T is increased by 1 in step S60. Subsequently, the fuel ratio of gasoline is increased in step S61, and the air-fuel ratio is controlled to be rich in step S62. Herein, increasing the fuel ratio of gasoline means to increase a ratio of gasoline relative to the whole fuel (hydrogen+gasoline) during the hydrogen-plus-gasoline lean engine operation, and to keep the current state during the gasoline engine operation. Then, the fuel is injected with the proper ratio of hydrogen and gasoline, which has been set by the control map of FIG. 8 in step S52, by both injectors 28 and 29 and the ignition with the ignition timing determined in step S53 are executed in step S63, and then the sequence returns.

When the flag $F_1$ is 1 in step S56, it is determined whether or not the count T equals C in step S64. When the count T does not equal C, the sequence proceeds to step S60 for increasing the count T by 1. Then, the controls in steps S61 through S63 are executed, and then the sequence returns. When the count T equals C, the sequence proceeds to step S65, where the flag $F_1$ is reset at 0, and then the trapped NOx amount Q is reset at 0 in step S66, and the count T is reset at 0 in step S67. Then, the fuel is injected with the proper ratio of hydrogen and gasoline, which has been set by the control map of FIG. 8 in step S52, by both injectors 28 and 29 and the ignition with the ignition timing determined in step S53 are executed in step S63, and then the sequence returns.

Figure 10:
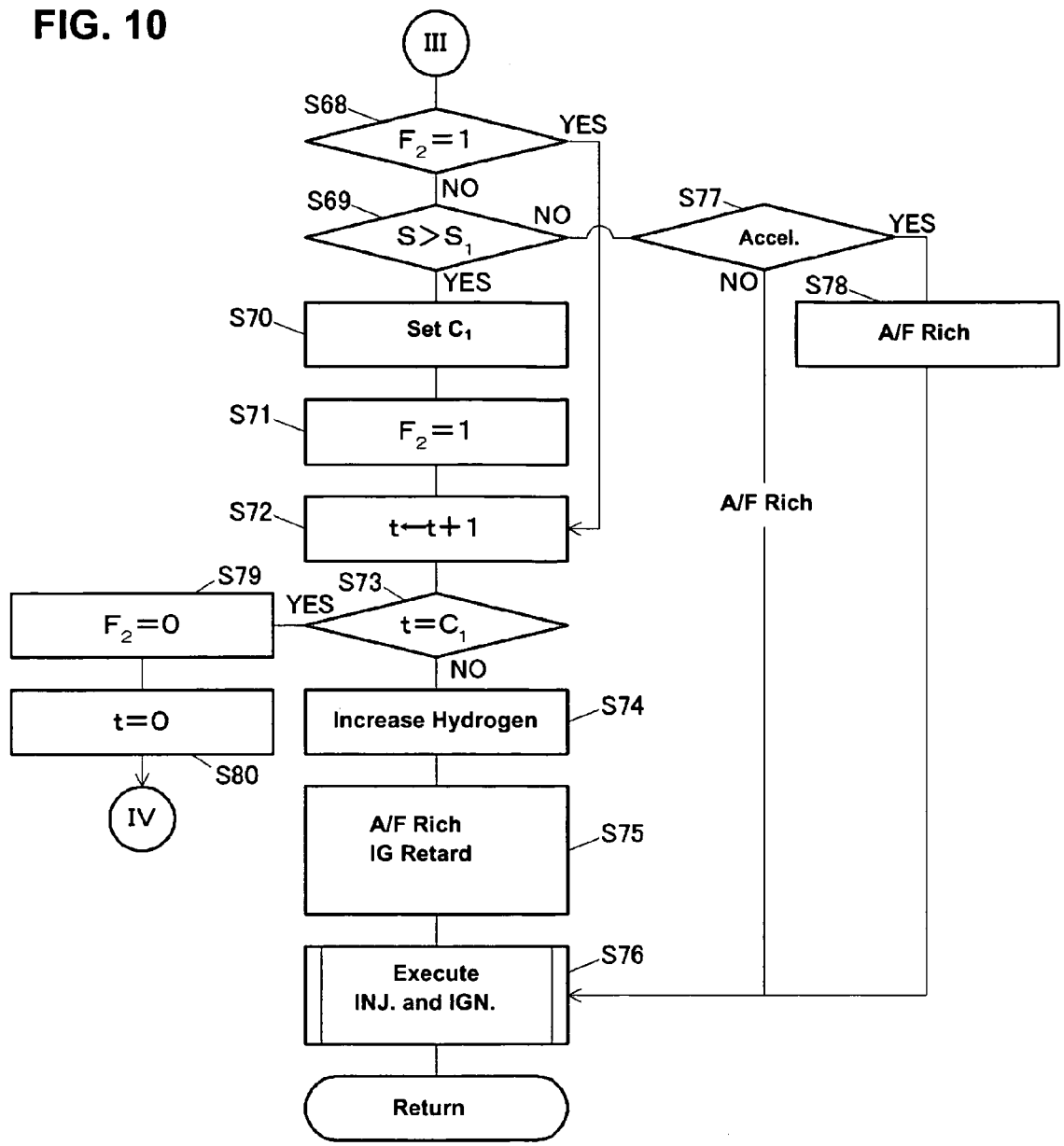
FIG. 10 is a flowchart showing part of control steps according to the second embodiment.

When the trapped NOx amount Q is not greater than $Q_1$ in step S57, the sequence proceeds to (III) of FIG. 10 for the SOx release control. Namely, it is determined whether or not the flag $F_2$ is 1 in this step S68. When the flag $F_2$ is not 1, it is determined whether or the SOx sulfur-poisoning amount S is greater than the second specified value $S_1$ in step S69. When the SOx sulfur-poisoning amount S is greater than the second specified $S_1$, the sequence proceeds to step S70, where the initial specified time period $C_1$ is set. Then, the flag $F_2$ is set at 1 in step S71, and the count t is increased by 1 in step S72. Next, it is determined whether or not the count t equals the above-described initial specified time period $C_1$ in step S73. When the count t does not equal the initial specified time period $C_1$, the sequence proceeds to step S74.

In step S74, the ratio of hydrogen relative to the whole fuel is increased. Namely, when gasoline only is used as the fuel (gasoline lean engine operation), the fuel is switched from gasoline to both hydrogen and gasoline or hydrogen only in step S89. Or, when both hydrogen and gasoline are used as the fuel (hydrogen-plus-gasoline lean engine operation), the ratio of hydrogen relative to the whole fuel is increased or the fuel is switched to hydrogen only in step S89. Then, setting the rich air-fuel ratio and the ignition retard is done in step S75, and the fuel injection set in steps S74 and S75 by both injectors 28 and 29 and the ignition with the retarded ignition timing set in step S75 are executed in step S76. And, the sequence returns finally.

Meanwhile, when the SOx sulfur-poisoning amount S is not greater than the second specified value $S_1$ in step S69, it is determined as to the engine acceleration operation in step S77. When it is determined that the engine acceleration occurs, the air-fuel ratio is controlled to be rich in step S78. Then, the fuel injection by the both injectors 28, 29 according to the ratio determined in step S52 based on the control map of FIG. 8 and the ignition with the ignition timing determined in step S53 are executed in step S76. Namely, when the acceleration occurs, the air-fuel ratio is made rich regardless of the kind of fuel used presently. Meanwhile, when no acceleration occurs, the fuel injection and the ignition are executed likewise in step S76.

Figure 11:
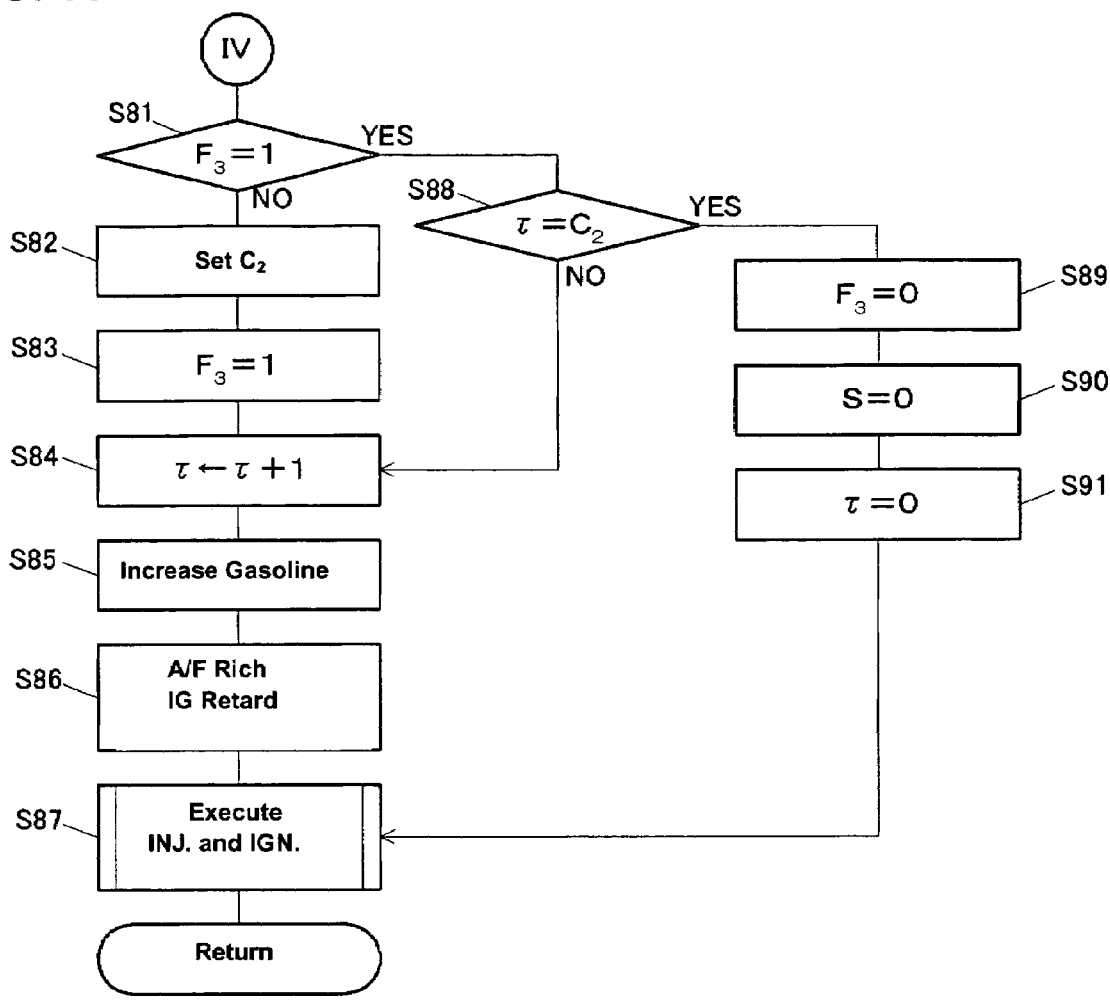
FIG. 11 is a flowchart showing part of control steps according to the second embodiment.

When the t equals $C_1$ in step S73, the flag $F_2$ is set at 0 in step S79 and the count t is reset at 0 in step S80, and then the sequence proceeds to (IV) of FIG. 11.

In the flowchart of FIG. 11, it is determined whether or not a flag $F_3$ is 1 in step S81. When the flag $F_3$ is not 1, the terminal specified time period $C_2$ is set in step S82, the flag $F_3$ is set at 1 in step S83, and the count $\tau$ is increased by 1 in step S84. Then, the ratio of gasoline in the fuel is increased in step S85. Herein, the fuel may be switched to only gasoline. Also, when the SOx release control has been done from the gasoline-only engine operation, the operation is returned to the state of gasoline only. When the SOx release control has been done from the hydrogen-plus-gasoline lean engine operation, the operation is returned to the state with the ratio prior to the SOx release control. Then, setting the rich air-fuel ratio and the ignition retard is done in step S86, and the fuel injection set in steps S85 and S86 by both injectors 28 and 29 and the ignition with the retarded ignition timing set in step S86 are executed in step S87. And, the sequence returns finally.

Meanwhile, when the flag $F_3$ is 1 in step S81, it is determined whether or not the count $\tau$ equals the terminal specified time period $C_2$ in step S88. When the count $\tau$ does not equal the terminal specified time period $C_2$, the sequence proceeds to step S84, where the count τ is increased by 1. Then, it proceeds to steps S85 through S87 for the execution of the air-fuel and timing control, finally returning. When the count τ equals the terminal specified time period $C_2$, the flag $F_3$ is reset at 0 in step S89, the SOx sulfur-poisoning amount S is reset at 0 in step S90, the count τ is reset at 0 in step S91, and then the sequence proceeds to step S87. Then, the fuel injection by both injectors 28, 29 according to the ratio determined in step S52 based on the control map of FIG. 8 and the ignition with the ignition timing determined in step S53 are executed, and the sequence returns.

Figure 12:
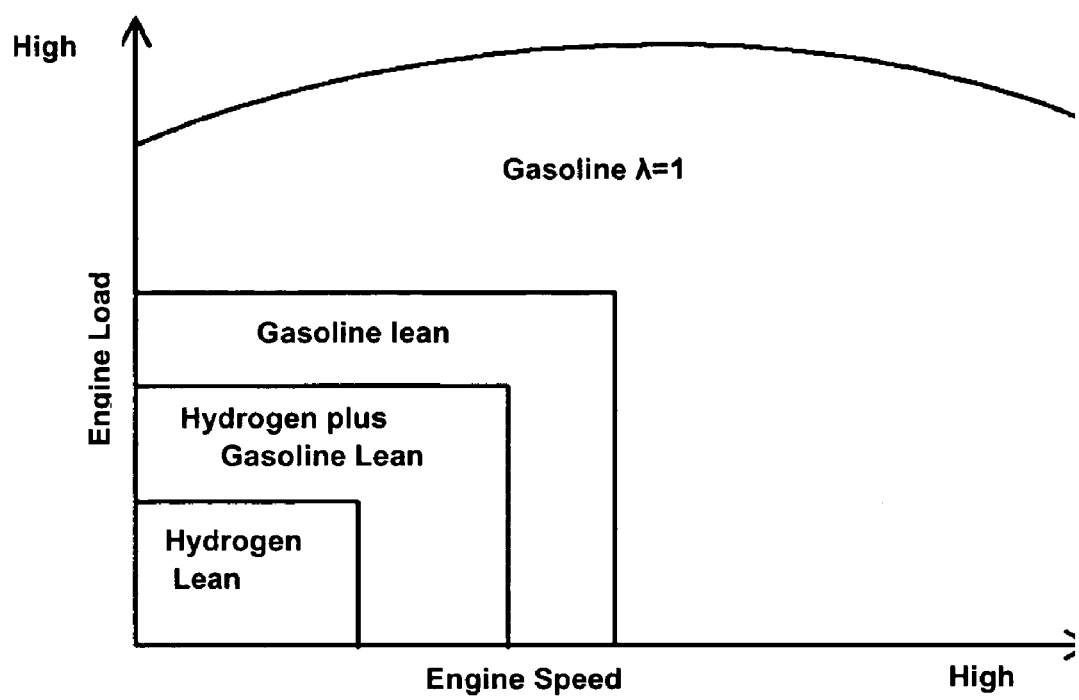
FIG. 12 is a control map according to a third embodiment of the present invention.

Further, FIG. 12 illustrates another control map for the engine 1 according to the third embodiment of the present invention. In this map, the hydrogen lean region is set at a low-load and low-speed engine operation area, where the lean burn with the hydrogen fuel is executed. And, the hydrogen-plus-gasoline lean region is set a higher-load and higher-speed engine operation than the hydrogen lean region, where gasoline is injected by the gasoline injector 29 mainly in the engine intake stroke and hydrogen is injected by the hydrogen injector 28 in the engine compression stroke so as to generate the substantially homogenous gasoline mixture in the combustion chamber and also locate the hydrogen around the ignition plug 25, thereby achieving the lean burn. Further, the gasoline lean region is set at a higher-load and higher-speed engine operation area than the hydrogen-plus-gasoline lean region, where the homogenous combustion of the gasoline fuel is executed. Additionally, a gasoline λ=1 region is set at a higher-load and higher-speed engine operation area, where the homogenous combustion of the gasoline fuel with the stoichiometric air-fuel ratio is executed.

Herein, the rich control for the NOx release during the engine operation at the hydrogen lean region is achieved by making the air-fuel ratio rich with the switching of the fuel to both hydrogen and gasoline or gasoline only, thereby restraining the combustion of hydrogen. Likewise, when the rich control is required during the engine operation at the hydrogen-plus-gasoline lean region, it is done with the increasing of the gasoline ratio or the switching of the fuel to gasoline only.

According to the above-described first through third embodiments, when the NOx release of the NOx trap catalysts 54 and 55 is required during the engine operation with the hydrogen fuel, the rich control of air-fuel ratio for the NOx release is executed with the switching of the fuel to gasoline only or the increasing of the gasoline ratio relative to the whole fuel. Thus, the combustion of hydrogen can be properly restrained at the rich control of air-fuel ratio. Namely, any improper vibrations or noises, which might be caused by the rich combustion of hydrogen with the high combustible reaction speed, can be restrained from occurring. Particularly, the control in which hydrogen is usually used and the fuel is switched to gasoline only for the NOx release can properly restrain an emission of CO, HC and so on, which are generated by the combustion of gasoline, and reduce a consumption of gasoline.

Also, according to the above-described second and third embodiments, when the NOx release of the NOx trap catalysts 54 and 55 is required during the engine operation when the NOx air-fuel ratio is lean and the fuel ratio of hydrogen relative to the whole fuel is great, the rich control of air-fuel ratio for the NOx release is executed with the increasing of the fuel ratio of gasoline injected by the gasoline injector 29 or the switching of the fuel to gasoline only. Thus, the fuel ratio of hydrogen is decreased instead, so that the combustion of hydrogen can be properly restrained and any improper vibrations or noises can be restrained from occurring thereby.

Further, according to the first through third embodiments, since the combustion of hydrogen during the engine acceleration operation dose not affect the vibrations or noises so much, i.e., it causes little uncomfortable torque shock to passengers, the switching to the gasoline fuel only may be prohibited at this time. In this case, unburned elements of gasoline, such as HC and CO, can be restrained from being emitted and the consumption of gasoline can be reduced. Meanwhile, when the trapped NOx amount exceeds the specified value, the fuel ratio of gasoline relative to the whole fuel supplied is increased as described above, thereby restraining any improper vibrations or noises caused by the combustion of hydrogen from occurring.

In the second and third embodiments, since the combustion of hydrogen during the engine acceleration operation dose not affect the vibrations or noises so much, i.e., it causes little uncomfortable torque shock to passengers, the ratio of the hydrogen fuel relative to the whole fuel supplied can be increased compared with the NOx release at the time the trapped NOx amount exceeds the first specified value $Q_1$. Thus, the emission of the unburned elements of gasoline can be restrained and the consumption of gasoline can be reduced.

Figure 13:
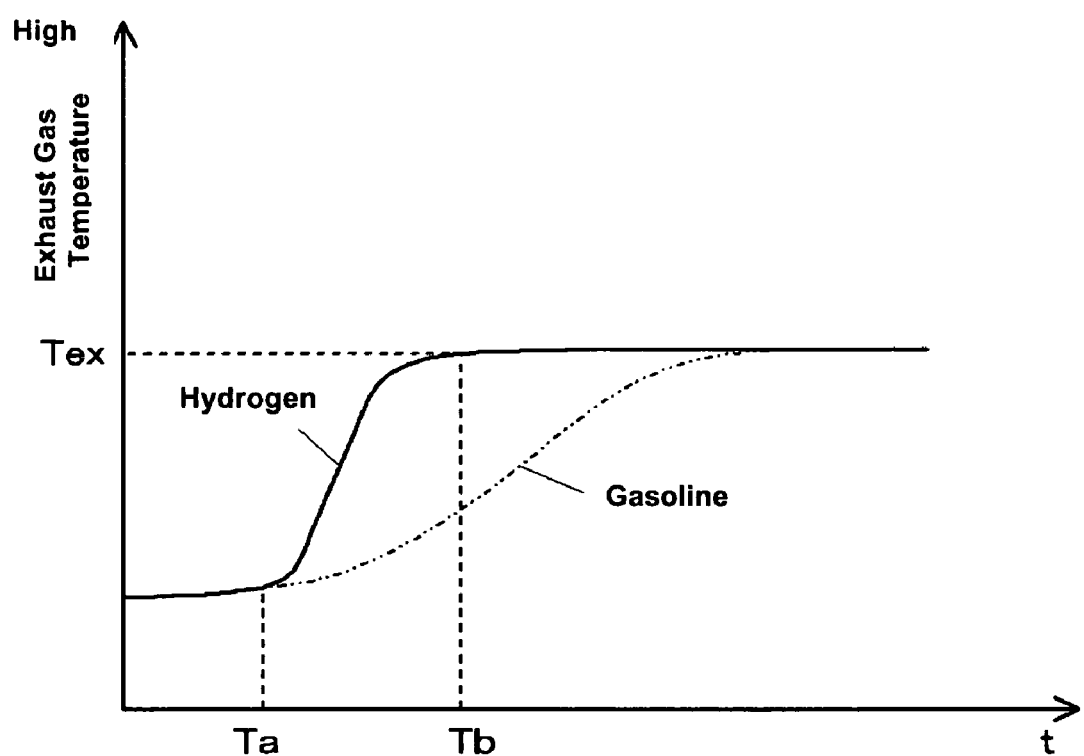
FIG. 13 is a map illustrating characteristics of increase of an exhaust-gas temperature of hydrogen and gasoline.

Meanwhile, the increase of the exhaust-gas temperature of hydrogen and gasoline shows characteristics illustrated in FIG. 13. The exhaust-gas-temperature increase of hydrogen is more prompt than that of gasoline as apparent from this figure.

As described above, according to the first through third embodiments, since the ratio of the hydrogen fuel during the first specified time period $C_1$ from the start of the air-fuel-ratio rich control is made greater than that after the specified time period $C_1$ has passed or the fuel is changed to the hydrogen fuel only when the SOx sulfur-poisoning amount S at the NOx trap catalysts 54 and 55 is greater than the specified value $S_1$, the exhaust-gas temperature can be increased promptly by the combustion of hydrogen with the high combustible reaction speed for a while, thereby furthering the releasing of SOx from the NOx trap catalysts 54 and 55.

As illustrated in FIG. 13, after the temperature of the exhaust gas has been increased sufficiently and promptly by the hydrogen fuel just after the SOx release start time Ta, the fuel is changed from hydrogen to gasoline at the time Tb when the exhaust-gas-temperature exceeds a specified value Tex. Thus, since the exhaust-gas temperature is increased promptly just after the SOx release starting, the start timing of the sulfur releasing can be advanced substantially, resulting in a shortened time period of the air-fuel-ratio rich control. As a result, the fuel economy can be improved. Also, the improper emission of $H_2S$ can be restrained by restraining the combustion of hydrogen after the time Tb.

Herein, the above-described control steps of the engine 1 is not limited to the reciprocating engine illustrated in FIG. 1, but this can be also applied to a rotary engine using both hydrogen fuel and the gasoline fuel.

The present invention should not limited to the above-described embodiment, but any other modifications and improvements may be applied within the scope of a sprit of the present invention.

What is claimed is:

1. A control device of a hydrogen engine, comprising:
   a NOx trap catalyst disposed in an exhaust gas passage, the NOx trap catalyst trapping NOx in an exhaust gas when the exhaust gas is in a lean air-fuel-ratio state and releasing a trapped NOx when the exhaust gas is in a rich air-fuel-ratio state including a substantially stoichiometric air-fuel ratio;

a first fuel supply means for supplying a fossil fuel into a combustion chamber;

a second fuel supply means for supplying a hydrogen fuel into the combustion chamber;

an engine operation detecting means for detecting an engine operating condition;

a fuel ratio changing means for changing a ratio of the fossil fuel supplied into the combustion chamber relative to the hydrogen fuel supplied based on the engine operating condition detected by said engine operation detecting means;

a NOx release determining means for determining whether it is required for the NOx trapped at said NOx trap catalyst to be released based on a state of the trapped NOx at said NOx trap catalyst;

a NOx releasing means for releasing the NOx trapped at said NOx trap catalyst by making the air-fuel ratio of the exhaust gas in said rich state when the NOx releasing requirement is determined by said NOx release determining means;

a fossil-fuel ratio increasing means for increasing the ratio of the fossil fuel supplied into the combustion chamber relative to the hydrogen fuel supplied when said NOx releasing requirement is determined by said NOx release determining means and said air-fuel-ratio rich control by said NOx releasing means is executed.

2. The control device of a hydrogen engine of claim 1, wherein said fuel ratio changing means is configured so as to switch the fuel supplied between the fossil fuel only and the hydrogen fuel only based on the engine operating condition, and said fossil-fuel ratio increasing means is configured so as to switch the fuel supply from the hydrogen fuel only to the fossil fuel only when said NOx releasing requirement is determined by said NOx release determining means and said air-fuel-ratio rich control by said NOx releasing means is executed, in a current engine operating state where only the hydrogen fuel is supplied into the combustion chamber.

3. The control device of a hydrogen engine of claim 1, wherein said fuel ratio changing means is configured so as to switch the fuel supplied between the fossil fuel only and both the fossil fuel and the hydrogen fuel based on the engine operating condition, and said fossil-fuel ratio increasing means is configured so as to increase the ratio of the fossil fuel supplied into the combustion chamber relative to the hydrogen fuel supplied when said NOx releasing requirement is determined by said NOx release determining means and said air-fuel-ratio rich control by said NOx releasing means is executed, in a current engine operating state where both the fossil fuel and the hydrogen fuel are supplied into the combustion chamber.

4. The control device of a hydrogen engine of claim 1, wherein said fuel ratio changing means is configured so as to change the fuel supplied among the fossil fuel only, the hydrogen fuel only and both the fossil fuel and the hydrogen fuel based on the engine operating condition, and said fossil-fuel ratio increasing means is configured so as to increase the ratio of the fossil fuel supplied into the combustion chamber relative to the hydrogen fuel supplied or change to the fossil fuel only when said NOx releasing requirement is determined by said NOx release determining means and said air-fuel-ratio rich control by said NOx releasing means is executed, in a current engine operating state where both the fossil fuel and the hydrogen fuel are supplied into the combustion chamber, whereas said fossil-fuel ratio increasing means is configured so as to change the fuel supply to the fossil fuel only or both the fossil fuel and the hydrogen fuel when said NOx releasing requirement is determined by said NOx release determining means and said air-fuel-ratio rich control by said NOx releasing means is executed, in a current engine operating state where only the hydrogen fuel is supplied into the combustion chamber.

5. The control device of a hydrogen engine of any one of claims 1 through 4, further comprising an acceleration detecting means for detecting an engine acceleration, wherein the air-fuel ratio of the fuel supplied into the combustion chamber is made rich when the engine acceleration is detected by said acceleration detecting means, without changing the fuel ratio set by said fuel ratio changing means.

6. The control device of a hydrogen engine of any one of claims 1 through 4, further comprising a sulfur-poisoning detecting means for detecting a parameter relating to a degree of sulfur-poisoning of said NOx trap catalyst, and a sulfur releasing means for releasing sulfur attached to said NOx trap catalyst by making the air-fuel ratio of the exhaust gas in a rich state when the degree of sulfur-poisoning detected by said sulfur-poisoning detecting means is greater than a specified value, wherein said fuel ratio changing means is configured so as to change the fuel ratio in such a manner that the ratio of the hydrogen fuel supplied into the combustion chamber relative to the gasoline fuel supplied during a first specified time period from a start of said air-fuel-ratio rich control by said sulfur releasing means is greater than that during a second time period after said first specified time period has passed.

7. The control device of a hydrogen engine of claim 6, further comprising an exhaust-gas temperature detecting means for detecting a parameter relating to a temperature of the exhaust gas, wherein said fuel ratio changing means is configured such that said first specified time period for a low exhaust-gas-temperature state is set to be longer than that for a high exhaust-gas-temperature state.

8. The control device of a hydrogen engine of claim 6, further comprising an exhaust-gas temperature detecting means for detecting a parameter relating to a temperature of the exhaust gas, wherein said increasing of the hydrogen-fuel ratio supplied into the combustion chamber by said fuel ratio changing means is configured so as to be restrained further in a high exhaust-gas-temperature state, compared with in a low exhaust-gas-temperature state.

9. A control device of a hydrogen engine, comprising:

a NOx trap catalyst disposed in an exhaust gas passage, the NOx trap catalyst trapping NOx in an exhaust gas when the exhaust gas is in a lean air-fuel-ratio state and releasing a trapped NOx when the exhaust gas is in a rich air-fuel-ratio state including a substantially stoichiometric air-fuel ratio;

a first fuel injector operative to supply a fossil fuel into a combustion chamber;

a second fuel injector operative to supply a hydrogen fuel into the combustion chamber;

a sensor operative to detect an engine operating condition;

a control unit operative to receive a detective signal of said sensor and control said first and second fuel injectors, wherein said control unit is configured so as to change a ratio of the fossil fuel supplied into the combustion chamber relative to the hydrogen fuel supplied based on the engine operating condition, determine whether it is required for the NOx trapped at said NOx trap catalyst to be released based on a state of the trapped NOx at said NOx trap catalyst, release the NOx trapped at said NOx trap catalyst by making the air-fuel ratio of the exhaust gas in said rich state when the NOx releasing requirement is determined, and increase the ratio of the fossil fuel supplied into the combustion chamber relative to the hydrogen fuel supplied when the NOx releasing requirement is determined and the air-fuel-ratio rich control is executed.

* * * * *